United States Patent
Hubbard

(10) Patent No.: US 10,017,356 B2
(45) Date of Patent: Jul. 10, 2018

(54) SHEET METAL GUIDE RAIL FOR AN ELEVATOR SYSTEM

(71) Applicant: OTIS ELEVATOR COMPANY, Farmington, CT (US)

(72) Inventor: James L. Hubbard, Kensington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 256 days.

(21) Appl. No.: 14/651,917

(22) PCT Filed: Dec. 14, 2012

(86) PCT No.: PCT/US2012/069731
§ 371 (c)(1),
(2) Date: Jun. 12, 2015

(87) PCT Pub. No.: WO2014/092721
PCT Pub. Date: Jun. 19, 2014

(65) Prior Publication Data
US 2015/0307320 A1    Oct. 29, 2015

(51) Int. Cl.
| | |
|---|---|
| B23K 31/02 | (2006.01) |
| B32B 37/18 | (2006.01) |
| B66B 7/02 | (2006.01) |
| B66B 5/16 | (2006.01) |
| B32B 37/12 | (2006.01) |
| B32B 38/00 | (2006.01) |

(52) U.S. Cl.
CPC .............. *B66B 7/022* (2013.01); *B23K 31/02* (2013.01); *B32B 37/12* (2013.01); *B32B 37/18* (2013.01); *B32B 38/0012* (2013.01); *B66B 5/16* (2013.01)

(58) Field of Classification Search
CPC .............. B66B 7/02; B66B 7/022; B66B 5/16
See application file for complete search history.

(56) References Cited

U.S. PATENT DOCUMENTS

| | | | | |
|---|---|---|---|---|
| 5,950,770 A | * | 9/1999 | Koeppe, Jr. .............. | B66B 7/022 187/406 |
| 2015/0136532 A1 | * | 5/2015 | Hubbard ................. | B66B 7/022 187/406 |

FOREIGN PATENT DOCUMENTS

| | | |
|---|---|---|
| CN | 201183699 Y | 1/2009 |
| JP | 57142722 A | 9/1982 |

(Continued)

OTHER PUBLICATIONS

Supplementary European Search Report and Communication; Application No. 12889913.5-1705/2931642; dated Oct. 20, 2016; 9 pages.

(Continued)

*Primary Examiner* — William E Dondero
*Assistant Examiner* — Diem M Tran
(74) *Attorney, Agent, or Firm* — Cantor Colburn LLP

(57) ABSTRACT

A guide rail for an elevator car in a hoistway includes a base connectable with a wall of the hoistway. A web portion is connected to and extends from the base to a rail tip. The web portion includes a closed cross-section defining a web cavity extending along a length of the guide rail. The closed cross-section is formed of a sheet metal material to improve the torsional stiffness of the rail. A filler strip is located in the closed web cavity to prevent damage to the closed cross-section under braking forces applied to the guide rail.

10 Claims, 3 Drawing Sheets

(56) References Cited

FOREIGN PATENT DOCUMENTS

| JP | 59108684 A | | 6/1984 | |
|---|---|---|---|---|
| JP | 05124780 A | | 5/1993 | |
| JP | 2516277 B2 | * | 7/1996 | ............ B66B 7/022 |
| JP | H1087224 A | * | 4/1998 | |
| KR | 20100111541 A | | 10/2010 | |
| WO | 2011117457 A1 | | 9/2011 | |
| WO | 2011146071 A1 | | 11/2011 | |
| WO | 2012087295 A1 | | 6/2012 | |

OTHER PUBLICATIONS

State Intellectual Property Office of Peoples's Republic China Search Report; Application No. 201280077665.1; dated Jul. 25, 2016; 2 pages.
Written Opinion of the International Searching Authority; Apllication No. PCT/US2012/069731; dated Aug. 28, 2013; 5 pages.
European Office Action Issued in EP Application No. 12889913.5, dated Oct. 24, 2017, 6 Pages.

\* cited by examiner

SHEET METAL GUIDE RAIL FOR AN ELEVATOR SYSTEM

BACKGROUND OF THE INVENTION

The subject matter disclosed herein generally relates to elevator systems. More specifically, the subject disclosure relates to guide rails for elevator cars.

Elevator systems typically include an elevator car suspended in a hoistway by a number of suspension ropes. To guide the elevator car in the hoistway, a number of car guide rails are arranged in the hoistway, for example, from the top to bottom of the hoistway. The elevator car is connected to the car guide rails via one or more guide shoes such that the elevator car follows a path defined by the car guide rails as it moves through the hoistway. Further, in some elevator systems, an emergency braking mechanism connected to the elevator car acts on the car guide rails to slow and/or stop the elevator car in the hoistway.

The typical car guide rail is a solid steel T-shaped rail. Such rail configurations are typically utilized because of their ability to withstand buckling and deflection during normal elevator operations and to withstand and loads applied during emergency braking. The typical car guide rails, however, are heavy and bulky, with each rail typically weighing 8 kilograms or more per meter and are typically installed in sections of 5 meters in length. Further, the amount of material used to form the rail drives the rail cost.

Sheet metal rails use less material and thus are less costly and lighter weight than traditional solid steel rail. Such rails have been utilized as counterweight guide rails, but not as elevator car guide rails because of the failure of such rail configurations to have the required torsional stiffness and crush resistance during operation of the elevator system and during emergency braking of the elevator car.

BRIEF DESCRIPTION OF THE INVENTION

According to one aspect of the invention, a guide rail for an elevator car in a hoistway includes a base connectable with a wall of the hoistway and a web portion connected to and extending from the base to a rail tip. The web portion includes a closed cross-section web cavity extending along a length of the guide rail. A filler strip is located in the web cavity to prevent damage to the web portion under braking forces applied to the guide rail.

According to this or other aspects of the invention, the closed cross-section of the web cavity is substantially rectangular.

According to this or other aspects of the invention, the guide rail includes one or more welds in the web portion to form the closed-cross-section of the web cavity.

According to this or other aspects of the invention, the one or more welds are intermittent along the length of the guide rail.

According to this or other aspects of the invention, the filler strip is secured in the web cavity.

According to this or other aspects of the invention, the filler strip is secured in the web cavity via one of an adhesive or weld.

According to another aspect of the invention, an elevator system includes an elevator car located in a hoistway and a guide rail extending along the hoistway and operably connected to the elevator car for guiding the elevator car along the hoistway. The guide rail includes a base securable in the hoistway and a web portion connected to and extending from the base to a rail tip. The web portion includes a closed cross-section web cavity extending along a length of the guide rail. A filler strip is located in the web cavity. A braking mechanism is in operable communication with the guide rail and the elevator car. The web cavity is configured such that braking forces applied by the braking mechanism to the web portion successfully reduce a speed of the elevator car without resulting in damage to the web portion.

According to yet another aspect of the invention, a method of forming a guide rail for an elevator car includes positioning a filler sheet steel material on a rail sheet steel material and feeding the filler sheet steel material and rail sheet steel material together toward a rail forming tool. The filler sheet steel material and the rail sheet steel material are formed into a guide rail via the rail forming tool. The guide rail includes a base securable in an elevator system hoistway and a web portion connected to and extending from the base to a rail tip. The web portion includes a closed cross-section web cavity extending along a length of the guide rail. The base and web portion are formed from the rail sheet steel material. A filler strip is located in the closed cross-section of the web cavity.

According to this or other aspects of the invention, the method further includes securing the filler sheet steel material to the rail sheet steel material.

According to this or other aspects of the invention, the method further includes urging the filler sheet steel material and rail sheet steel material through one or more roller sets.

According to this or other aspects of the invention, the method further includes feeding the filler sheet steel material from a filler sheet steel coil.

According to this or other aspects of the invention, the filler sheet steel coil is disposed between the forming tools and a rail sheet steel coil.

According to this or other aspects of the invention, the rail forming tool is one or more roll forming tools.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
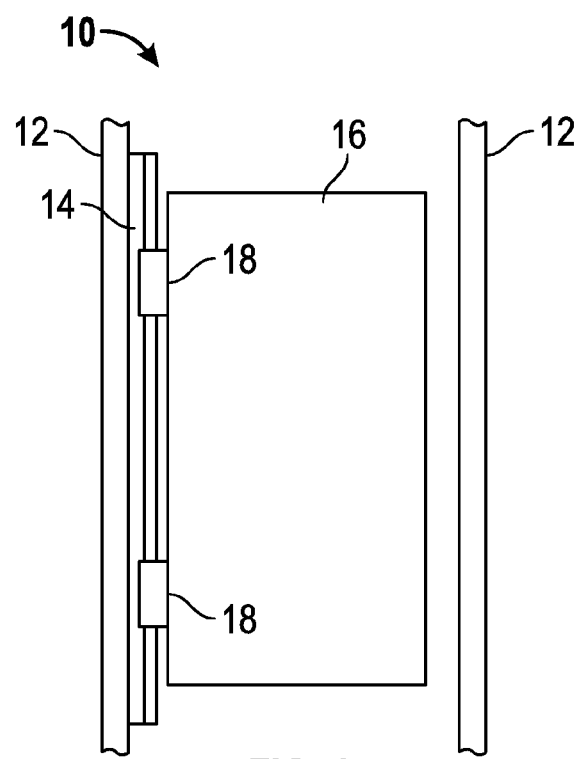
FIG. 1 is a schematic view of an embodiment of an elevator system.

Shown in FIG. 1 is an embodiment of an elevator system 10. The elevator system 10 is located in a hoistway 12 and includes one or more car guide rails 14 affixed to the hoistway 12. The car guide rails 14 are connected to an elevator car 16 to guide the movement of the elevator car 16 through the hoistway 12. As shown in FIGS. 1, in some embodiments, the elevator car 16 includes at least one guide shoe 18 which interfaces with the guide rail 14.

Figure 2:
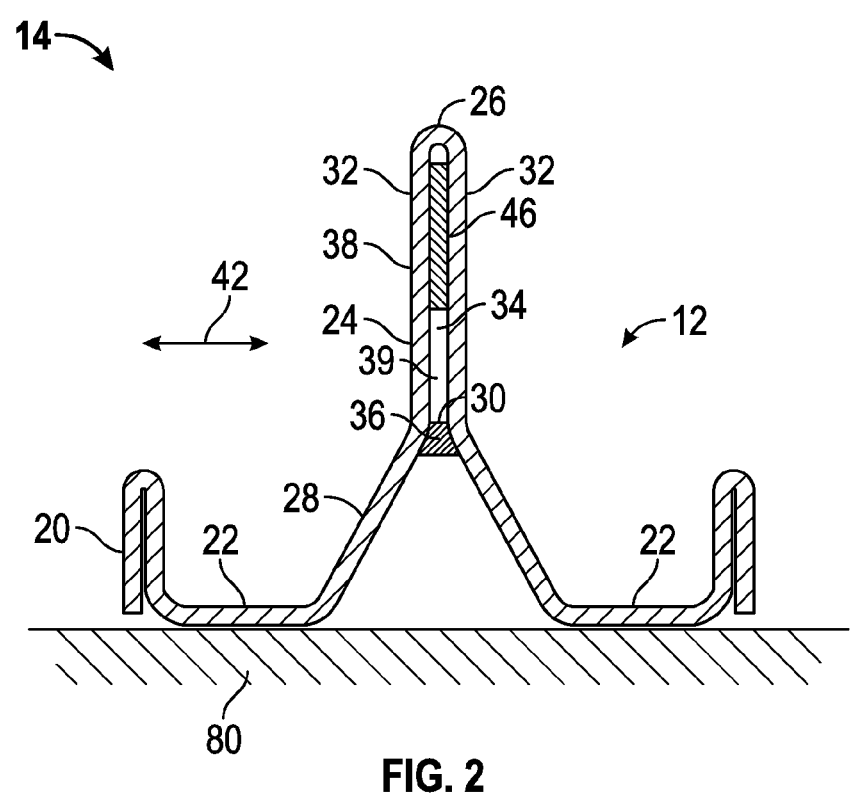
FIG. 2 is a cross-sectional view of an embodiment of a guide rail for an elevator system.

An embodiment of a car guide rail 14 is shown in FIG. 2. The cross-section is formed from a sheet metal, which may be bent, roll-formed, welded, and/or otherwise manipulated into the final shape. The guide rail 14 of FIG. 2 is formed from a single piece of sheet metal. In other embodiments, however, the car guide rail 14 may be formed of two or more pieces of sheet metal formed into the car guide rail 14. The car guide rail 14 includes a base 20 having two base pads 22 configured to rest against a wall 80 (or wall mounting bracket) of the hoistway 12.

A web portion 24 extends from the base 20 into the hoistway 12 toward the elevator car 16 and terminates at a rail tip 26. To enhance stiffness of the car guide rail 14, a transition portion 28 is located between the base 20 and the web portion 24. In some embodiments, such as shown in FIG. 2, the transition portion 28 is substantially triangular in shape having an apex 30 at the web portion 24. The web portion 24 is two sheet thicknesses 32 of sheet metal material extending to the rail tip 26, with a gap or opening 34 between the two sheet thicknesses 32. The opening 34 extends from the rail tip 26 to the apex 30. A weld 36 is located at or near the apex 30 to secure the two sheet thicknesses 32 together at the apex 30. The weld 36 may be intermittent along a length of the car guide rail 14, for example, the welds 36 may be located every 100 mm to 500 mm along a length of the car guide rail 14. Inclusion of the weld 36 in the car guide rail 14 configuration results in a torque box 38 structure at the web portion 24, defined by the rail tip 26 and the weld 36 at each end of the torque box 38, and the two sheet thicknesses 32 defining the lateral sides of the torque box 38. The torque box structure 38 has a closed cross section forming a web cavity 39 extending along a length of the car guide rail 14. Configuring the car guide rail 14 with a torque box 38 structure at the web portion 24 increases torsional stiffness of the car guide rail 14, making the web portion 24 more resistant to deflection in a lateral direction 42 relative to previous sheet metal rail configurations, and comparable to deflection performance of traditional sold steel guide rails.

Figure 3:
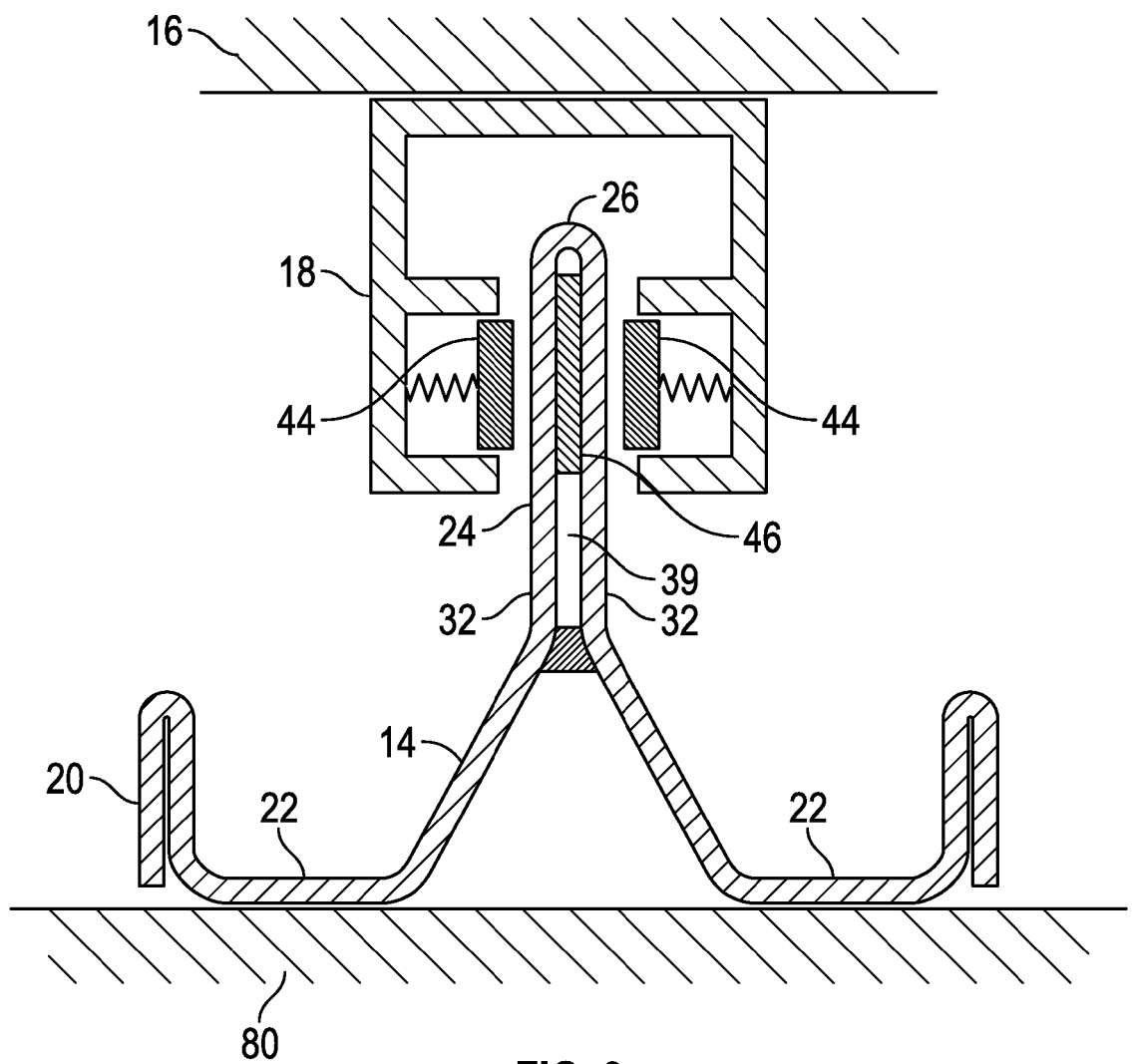
FIG. 3 is another cross-sectional view of an embodiment of a guide rail for an elevator system.

As shown in FIG. 3, the elevator car 16 has a guide shoe 18 including a safety brake 44. When a condition exists in which the elevator car 16 needs to be stopped, the safety brake 44 is actuated to engage the car guide rail 14 and stop the elevator car 16. More specifically, safety brake 44 applies braking forces to the web portion 24, in order to stop the elevator car 16. To prevent crushing of the web portion 24 under these braking forces, a filler strip 46, such as a metal strip, is located in the web portion 24 between the two sheet thicknesses 32. In some embodiments, a filler strip thickness is substantially the same as sheet thicknesses 32, in the range of 2 to 3 millimeters. This results in a thickness of the web portion 24 of between 8 and 9 millimeters, which equals a web thickness of conventional typical solid steel rails. Thus, the conventional rails can be replaced with car guide rails 14 without modification of hardware for mounting the car guide rails 14 in the hoistway 12 or elevator car 16 interfaces such as guide shoes 18 or safety brakes 44.

Figure 4:
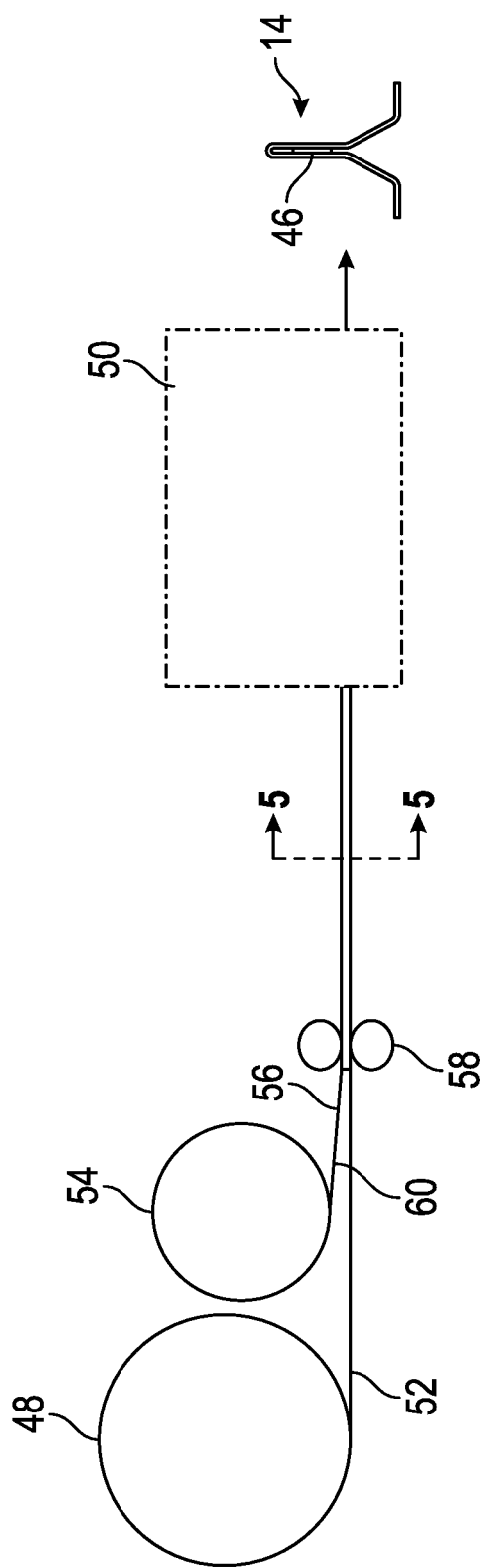
FIG. 4 is a schematic view of an embodiment of a method for forming an elevator guide rail.
Figure 5:
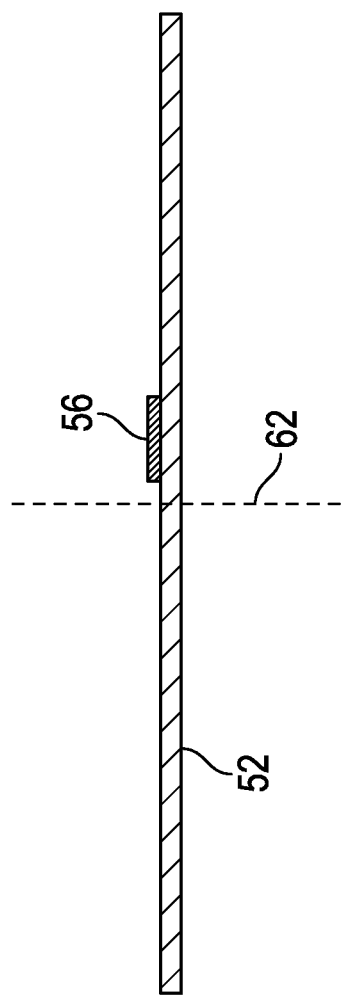
FIG. 5 is a cross-sectional view of a portion of an embodiment of an elevator guide rail prior to forming the rail shape.

Referring to FIG. 4, the filler strip 46 is located and secured in the car guide rail 14 in the web cavity 39 during forming of the car guide rail 14. The car guide rail 14 is formed by a roll forming operation. The material for the car guide rail 14 is provided as a rail sheet steel coil 48. Material from the rail sheet steel coil 48 is fed into one or more roll forming tools 50, where the rail sheet steel material 52 is formed into the selected car guide rail shape 14 by bending and other operations. To place the filler strip 46 in the car guide rail 14, a filler sheet steel coil 54 is placed to feed filler sheet steel material 56 onto the rail sheet steel material 52 before the rail sheet steel material 52 is formed into the car guide rail shape 14 by the roll forming tools 50. In the embodiment shown, the filler sheet steel coil 54 is placed between the rail sheet steel coil 48 and the roll forming tools 50. Both the filler sheet steel material 56 and the rail sheet steel material 52 are fed to a set of rollers 58. Before passing through the rollers 58, a pressure sensitive adhesive 60 is applied to one or both of the filler sheet steel material 56 and the rail sheet steel material 52. When the two material sheets pass through the rollers 58, the rollers 58 press the filler sheet steel material 56 and the rail sheet steel material 52 together, and they are secured by the pressure sensitive adhesive 60, with the filler sheet steel material 56 positioned such that it is in a selected position in the web portion 24 once forming is complete via the roll forming tools 50. Alternatively, the filler sheet steel material 56 may be secured to the rail sheet steel material 52 by liquid adhesive, spot weld, or other suitable method. For example, as shown in FIG. 5, the filler sheet steel material 56 may be placed to one side of a midpoint 62 of the rail sheet steel material 52. Referring again to FIG. 4, the two materials are then fed from the rollers 58 into the roll forming tools 50, where the car guide rail 14, including the filler strip 46 is formed to the selected shape.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A guide rail for an elevator car in a hoistway, comprising:
    a base connectable with a wall of the hoistway;
    a web portion connected to and extending from the base to a rail tip, the web portion including a closed cross-section web cavity extending along a length of the guide rail; and
    a filler strip disposed in the web cavity to prevent damage to the web portion under braking forces applied to the guide rail;
    the web portion formed from two sheet thicknesses of sheet metal material connected to and extending from the base; the web cavity defined between a first sheet metal thickness of the two sheet metal thicknesses and a second sheet metal thickness of the two sheet metal thicknesses; a weld connecting the first sheet metal thickness to the second sheet metal thickness to form the closed cross-section of the web cavity.

2. The guide rail of claim 1, wherein the closed cross-section of the web cavity is substantially rectangular.

3. The guide rail of claim 1, wherein the one or more welds are intermittent along the length of the guide rail.

4. The guide rail of claim 1, wherein the filler strip is secured in the web cavity.

5. The guide rail of claim 4, wherein the filler strip is secured in the web cavity via one of an adhesive or weld.

6. The elevator system of claim 1, wherein the one or more welds are intermittent along the length of the guide rail.

7. An elevator system comprising:
an elevator car disposed in a hoistway;
a guide rail extending along the hoistway and in operable communication with the elevator car for guiding the elevator car along the hoistway, the guide rail including:
 a base securable in the hoistway;
 a web portion connected to and extending from the base to a rail tip, the web portion including a closed cross-section web cavity extending along a length of the guide rail; and
 a filler strip disposed in the web cavity; and
a braking mechanism in operable communication with the guide rail and the elevator car, the filler strip configured to prevent damage to the web portion under braking forces applied to the guide rail;
the web portion formed from two sheet thicknesses of sheet metal material connected to and extending from the base; the web cavity defined between a first sheet metal thickness of the two sheet metal thicknesses and a second sheet metal thickness of the two sheet metal thicknesses; a weld connecting the first sheet metal thickness to the second sheet metal thickness to form the closed cross-section of the web cavity.

8. The elevator system of claim 7, wherein the closed cross-section of the web cavity is substantially rectangular.

9. The elevator system of claim 7, wherein the filler strip is secured in the web cavity.

10. The elevator system of claim 9, wherein the filler strip is secured in the web cavity via one of an adhesive or weld.

* * * * *